United States Patent
Pathak et al.

(10) Patent No.: US 10,281,973 B2
(45) Date of Patent: May 7, 2019

(54) APPLICATION POWER USAGE

(71) Applicant: Apple Inc., Cupertino, CA (US)

(72) Inventors: Abhinav Pathak, San Jose, CA (US);
Albert S. Liu, Fremont, CA (US);
Amit K. Vyas, San Jose, CA (US);
Drew A. Schmitt, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 15/171,395

(22) Filed: Jun. 2, 2016

(65) Prior Publication Data

US 2017/0351310 A1    Dec. 7, 2017

(51) Int. Cl.
*G06F 1/32*    (2006.01)
*G06F 1/3287*    (2019.01)

(52) U.S. Cl.
CPC .................. *G06F 1/3287* (2013.01)

(58) Field of Classification Search
None
See application file for complete search history.

(56) References Cited

U.S. PATENT DOCUMENTS

| | | | |
|---|---|---|---|
| 8,145,918 B2 | 3/2012 | Borghetti et al. | |
| 8,650,552 B1 | 2/2014 | Liao | |
| 9,170,916 B2 | 10/2015 | Dalton et al. | |
| 2008/0186960 A1* | 8/2008 | Kocheisen | G06F 3/165 370/359 |
| 2011/0040990 A1* | 2/2011 | Chan | G06F 1/28 713/300 |
| 2011/0072378 A1* | 3/2011 | Nurminen | G06F 1/32 715/771 |

* cited by examiner

*Primary Examiner* — Paul Yen
(74) *Attorney, Agent, or Firm* — Womble Bond Dickinson (US) LLP (57) ABSTRACT

Systems and methods are disclosed for determining hours of utility of an application per amount of energy consumed by the application for a wide variety of device types. For each subsystem of a client device, a model of the subsystem is used to estimate a portion of the total energy consumed by the subsystem during a predetermined period of time. Energy consumed by a subsystem is apportioned to one or more applications or daemons that utilize the subsystem. Energy usage by a daemon is apportioned to one or more applications that the daemon performs work on behalf of. A large sample of application energy consumption information is gathered by an energy server and provided to an application information server that is accessible by developers. Thus, a developer can view energy consumption vs. application utility, by client device type and by subsystem for the client device type.

24 Claims, 9 Drawing Sheets

| Application Battery Life Metrics 700 | | | | |
|---|---|---|---|---|
| Application: | | Live Streaming Video v37.0 705 | | |
| Developer: | | Independent Developers Inc. 710 | | |
| Device type 715 | Smartphone 716 | Smart Phone+ 717 | Tablet 718 | Tablet+ 719 |
| Battery charge 720 | 1715 mAh | 1810 mAh | 8027 mAh | 11560 mAh |
| Application use 721 | 12 hrs | 12.1 hrs | 14 hours | 10 hours |
| Non-utility usage 722 | 10% | 12% | 9% | 15% |
| Use by Mode 730 | | | | |
| Foreground use 731 | 90% | 88% | 90% | 88% |
| Background use 732 | 10% | 12% | 10% | 12% |
| Use by Subsystem 740 | | | | |
| Display 741 | 65% | 62% | 67% | 70% |
| CPU 742 | 18% | 20% | 15% | 18% |
| WiFi 743 | 15% | 14% | 13% | 10% |
| Other 744 | 2% | 4% | 5% | 2% |

APPLICATION POWER USAGE

TECHNICAL FIELD

This disclosure relates to the field of determining power utilization by applications and subsystems in a computing device.

BACKGROUND

A client device has an energy source. An energy source can be one or more batteries, capacitive storage systems, or power provided by an AC/DC converter from an external power source. A client device can have a variety of subsystems that consume energy. Subsystems can include one or more processors, a display, networking components, an audio system, or a WiFi module and a cellular module. An application running on the client device utilizes one or more of these subsystems. Application developers will sometimes disclose an expected number of hours that an application can be used by a client device during a single charge of the client device.

However, client devices have different battery sizes. Thus application usage time per charge can vary by device type. In addition, an application can be used under a wide variety of physical conditions such as ambient light or signal strength for WiFi or cellular connectivity. An application may also be used at different performance levels, such as audio volume, display brightness, or processing power for different game difficulty levels. Further, multiple applications can be running on a client device at a same time utilizing one or more of the same subsystems. Moreover, a developer may have a defect ("bug") in the application that consumes energy that provides no utility to the user. For example, a GPS system may be running in the background for a navigation application, updating the user's location even when the user is not navigating. Thus, the GPS background updates consume energy without providing utility to the user.

SUMMARY OF THE DESCRIPTION

Systems and methods are disclosed for determining hours of utility of an application per amount of energy consumed by the application for a wide variety of device types. A large sample of application energy consumption information is gathered by an energy usage server and provided to an application information server that is accessible to developers. Thus, a developer can view energy consumption vs. application utility, by client device type and by subsystem for the client device type.

In an embodiment, a client device has an energy source and an energy measurement system that measures total energy consumed from the energy source over a predetermined period of time. A model of each subsystem of the client device can contain logic that determines a portion of the total energy consumed that is attributable to the subsystem. An accounting system applies heuristics, using "on behalf of" relationships, to determine which applications and/or daemons in the client device have consumed energy attributable to the subsystem. Energy usage information can then be collated by application, by subsystem, for the client device type, and transmitted to the application information server. A developer can access the information server to determine energy consumption and utility of the consumed energy for the application for a plurality of device types.

In another embodiment, an energy usage server can receive a large plurality of energy usage information samples per application, subsystem, and client device type ("crowd source information"). For each client device type, for each application, and each subsystem in the application, crowd source information can be analyzed to generate one or more reports with a breakdown of energy usage in the foreground and background, utility of the energy consumed, and energy usage by subsystems for each device type.

In an embodiment a non-transitory computer readable medium can store executable instructions, that when executed by a processing system, can perform any of the functionality described above.

In yet another embodiment, a processing system, comprising at least one hardware processor, coupled to a memory programmed with executable instructions can, when the instructions are executed by the processing system, perform any of the functionality described above.

Some embodiments described herein can include one or more application programming interfaces (APIs) in an environment wherein calling program code interacts with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
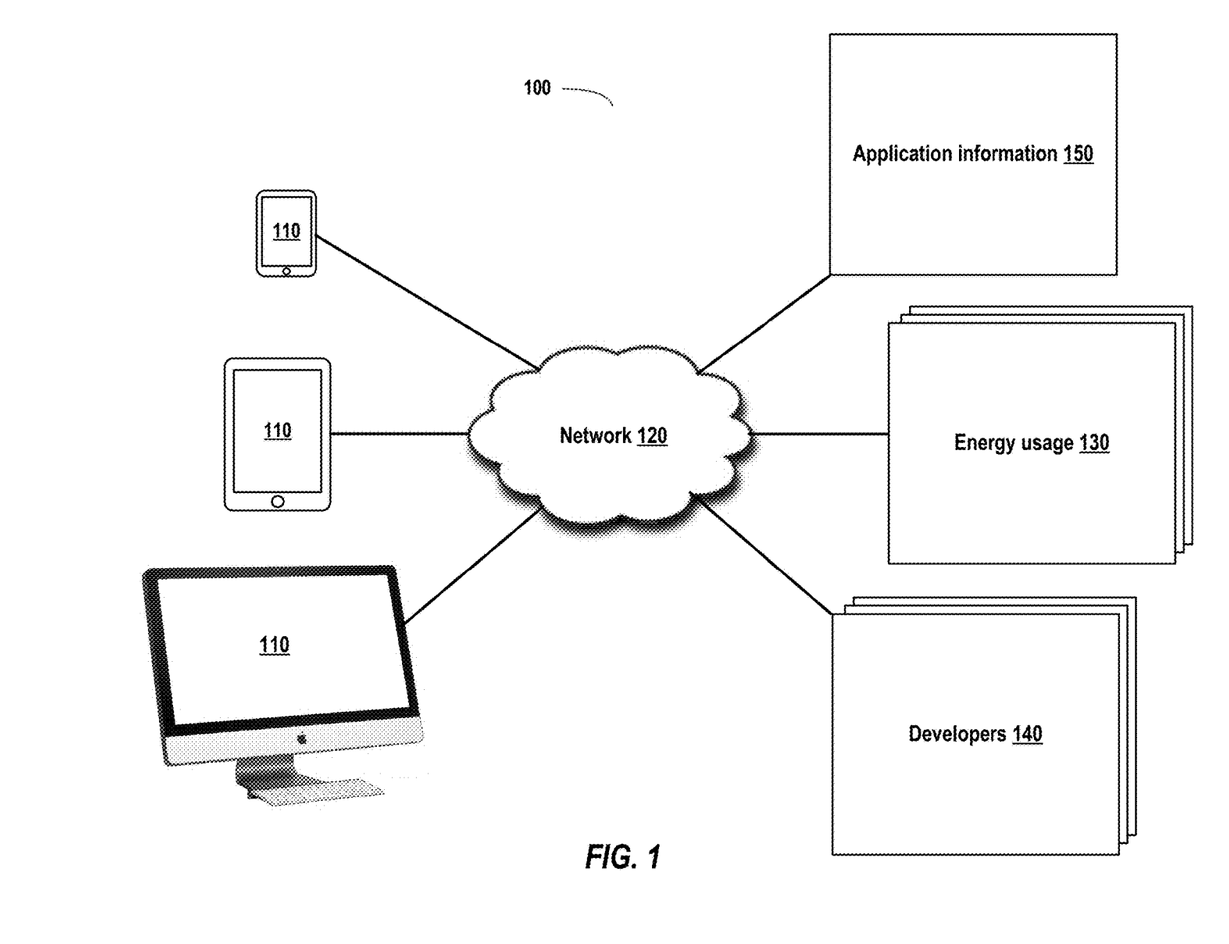
FIG. 1 illustrates, in block form, an overview of a system that provides energy usage information to developers of applications according to some embodiments.

FIG. 1 illustrates, in block form, an overview of a system 100 that provides energy usage information to developers of applications according to some embodiments.

An energy usage information system 100 can comprise a large plurality of client devices 110 coupled to energy usage server 130 via network 120. A plurality of client devices 110 can each run one more applications that consume energy. Energy usage logic, described in detail below, can determine for each application on a client device 110, the amount of energy consumed that is attributable to the application and various subsystems of the client device 110 used by the application. This energy usage information can be transmitted over network 120 to energy usage server 130. Energy usage server 130 can process energy usage information received from a large plurality of client devices 110 ("crowd sourced information") to determine energy usage trends of an application, per client device type, over a large variety of application usage conditions. Application usage conditions can include the energy source for a device, e.g. battery or AC/DC converter, an amount of ambient light that may dictate display brightness, ambient sound that may affect audio sound level, whether the application is being run in the foreground or background, or whether the application is being run at a high performance level e.g. for graphics of a game. These are only a few examples of operating conditions that may affect energy consumption by an application. These conditions can be detected and saved with other energy usage information described below.

Energy usage server 130 can process crowd sourced energy usage information and transmit the processed energy usage information to application information server 150. In an embodiment, application information server 150 and energy usage server 130 can be the same server. Developers 140 can access energy usage information for application(s) developed by the developer 140, from application information server 150. Application information server 150 can include a developer portal that a developer can interact with to get energy utility information about one or more application developed by the developer. Application information server 150 can be, e.g., Apple® iTunes® Connect. In an embodiment, a user of a client device 110 that has purchased, or otherwise legitimately obtained usage of, an application can access energy usage information on information server 150 using client device 110 over network 120. In an embodiment, application information server 150 can comprises a service, such as Apple® iTunes® Connect service, accessed by an account and login credentials.

Client device 110 can comprise a desktop computer, such as an Apple® iMac®, a tablet computer, such as an Apple® iPad®, an Apple® iPhone® or other computing device 110 as described below with reference to FIG. 9. Client device 110 is a device that will receive, install, and run an application developed by a developer 140.

Network 120 can be any type of network, such as Ethernet, Token Ring, Firewire, USB, Fibre Channel, or other network type.

Energy usage server 130 and application information server 150 can be any type of computing device as described below with reference to FIG. 9. Servers 130 and 150 can comprise one or more processing units, local storage such as hard disk(s), solid state storage, CD-ROM(s) and/or remote storage such as cloud storage.

Figure 2:
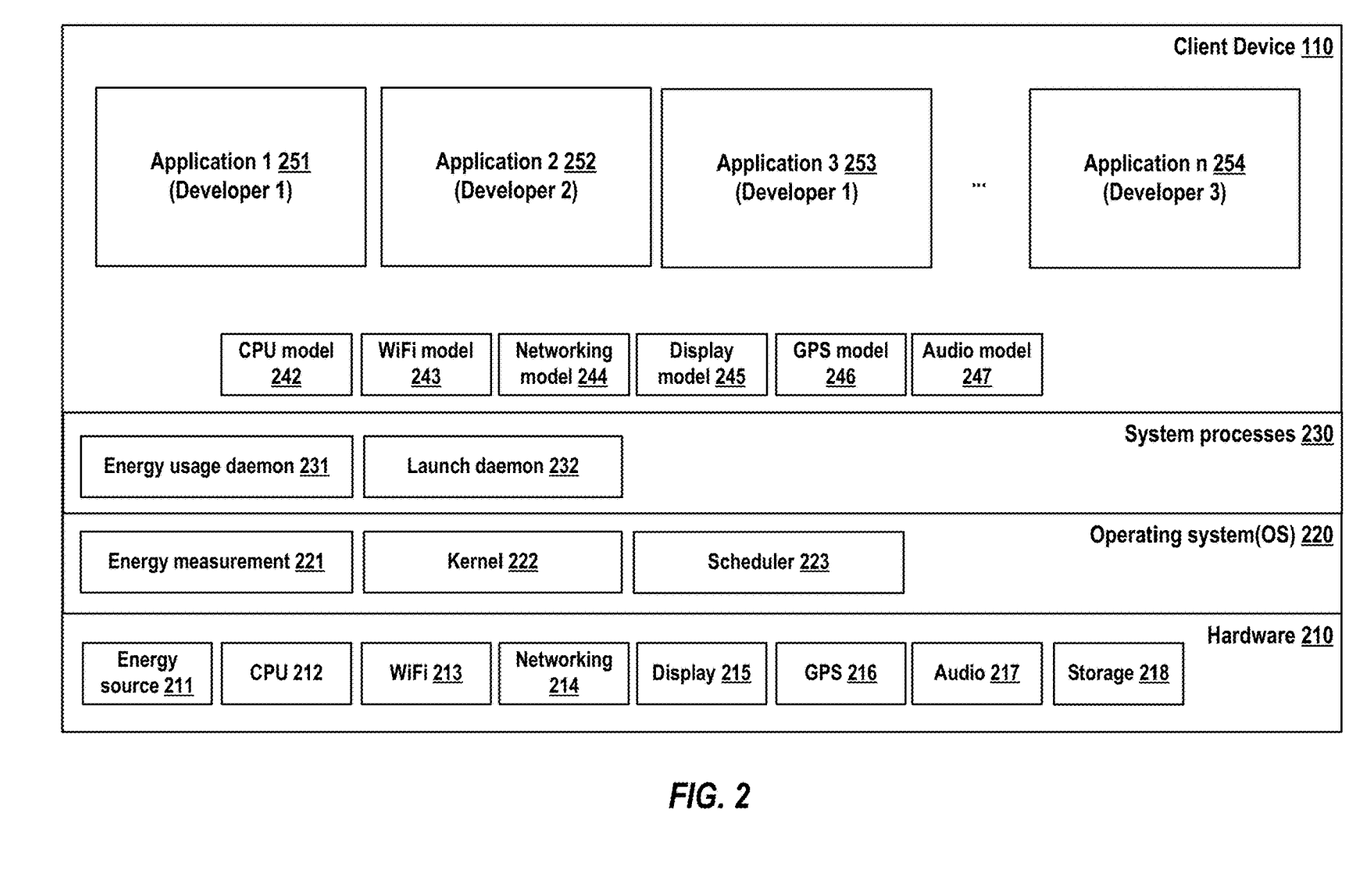
FIG. 2 illustrates, in block form, internal components of a client device in a system that provides energy information to developers of applications, according to some embodiments.

FIG. 2 illustrates, in block form, internal components of a client device 110 in a system 100 that provides energy information to developers of applications, according to some embodiments. A goal of the energy usage information is to determine an amount of utility that the user receives in relation to the energy consumed by an application. For example, an application that is running in the background and is updating a display consumes energy but does not provide utility because the user cannot perceive the updating of the display. A GPS system running in the background that updates a navigation application that is running in the foreground consumes energy that provides utility to the user because the user can perceive the updated GPS information. Audio that is playing in the background that is not associated with video, or is associated with video that is displayed in the foreground, consumes energy and provides utility to the user. Audio that is playing in the background and is associated with video that is running in the background does not provide utility because the user cannot perceive the video associated with the audio. Each energy usage model 242 through 247 can make energy utility determinations associated with energy usage of an application.

Internal components of client device 110 can include hardware 210, an operating system 220, system processes 230, energy usage models, e.g. 242 through 247, and one or more applications, e.g. applications 251 through 254. Client device 110 hardware 210 can include an energy source 211, one or more hardware processors 212, a WiFi subsystem 213, network communication components 214, a display subsystem 215, a global positioning satellite (GPS) subsystem 216, an audio subsystem 217, and volatile and non-volatile storage 218. Exemplary hardware 210 is described in detail with respect to FIG. 9, below.

Client device 110 comprise an operating system 220 that includes an energy measurement module 221, a kernel 222, and a scheduler 223. Operating system 220 and kernel 222 can include one or more application programming interfaces (APIs), frameworks, libraries and other functionality. APIs are described in detail, below, with reference to FIG. 8.

Client device 110 can further comprise system processes 230 such energy usage daemon 231 and launch daemon 232. Energy usage daemon 231 can provide, or call, functionality to determine energy usage by subsystems of client device 110 that is attributable to an application.

Energy usage information can be determined, in part, by the usage of subsystem-specific models. Energy utility to an application can also be determined by the subsystem models. Subsystem models can include a CPU model 242, a WiFi model 243, a networking model 244, a display model 245, a GPS model 246, and an audio model 247. These subsystems models are exemplary and not limiting.

A CPU model 242 can determine energy usage of a processing system 212 that is attributable to an application. CPU model 242 may call kernel 222 and/or scheduler 223 to determine whether, e.g., an application is running in the foreground or background, whether the application is utilizing a general processing unit, or a specialized processing unit such as a graphics processor, an operating mode of the processor(s) used by the application, and time slices of processor usage by the application.

A WiFi model 243 can determine energy usage attributable to an application by a WiFi subsystem. In an embodiment, WiFi model 243 can determine energy usage attributable to an application by a number of bytes transmitted and/or received by an application. WiFi model 243 can also determine energy usage attributable to scanning, weak signals, connecting to a network, and other WiFi functionality performed on behalf of an application, and determine the energy attributable to the application. WiFi model 243 can detect a type of data transmitted and/or received and whether such information provides utility to the user. For example, after an amount of video buffering, a WiFi model 243 can determined whether video data is being streamed to an application that is running in the background and is thus consuming energy without providing utility. WiFi model 243 can also determine whether audio is being streamed to an application when the audio volume is disabled and thus does not provide utility to the user.

Networking model 244 can determine a number of bytes transmitted and/or received by an application and apportion energy consumed by the networking subsystem 214 to applications on the basis of bytes transmitted and/or received by the application. Networking model 244 can utilize similar logic to the WiFi model 243 for determining energy usage apportionment and utility of the network subsystem 214 on behalf of one or more applications.

Display model 245 can determine energy usage and apportionment between applications using the display. Display model 245 can also determine utility of the energy consumed by an application. In addition to usage time and utility, display model 245 can gather additional information such as ambient light, background lighting, and display brightness during display usage by an application. This information can help a developer understand the environment in which an application is being used. Display model 245 can detect an application that is running in the background and is utilizing a display adapter to update the display when the display is not visible to the user (i.e., in the background). In some contexts, this may be desirable and in others it may be an application defect. Display model 245 can identify energy usage consumed on behalf of the application that updates the display on behalf of the application when the application is running in the background.

GPS model 246 can apportion energy usage on the basis of a frequency with which an application requests GPS updates. GPS model 246 can determine whether a requesting application is running in the foreground or background to determine utility of the energy consumed by the GPS on behalf of the application.

Audio model 247 can determine energy usage by the audio subsystem 217 on behalf of one or more applications. Audio model 247 can apportion the energy usage, and determine the utility of the energy usage, to one or more applications.

A graphics processing unit (GPU) model (not shown) can determine energy usage attributable to processing performed on behalf of an application. GPU can determine processing time attributable to an application by one or more calls to a kernel, scheduler, or operating system function, API, or framework that can determine GPU usage by application.

Client device 110 can include one or more applications 251-254 that may have been developed by one or more developers, such as developer 1 (applications 251 and 253), developer 2 (application 252), or developer 3 (application "n" 254).

Figure 3:
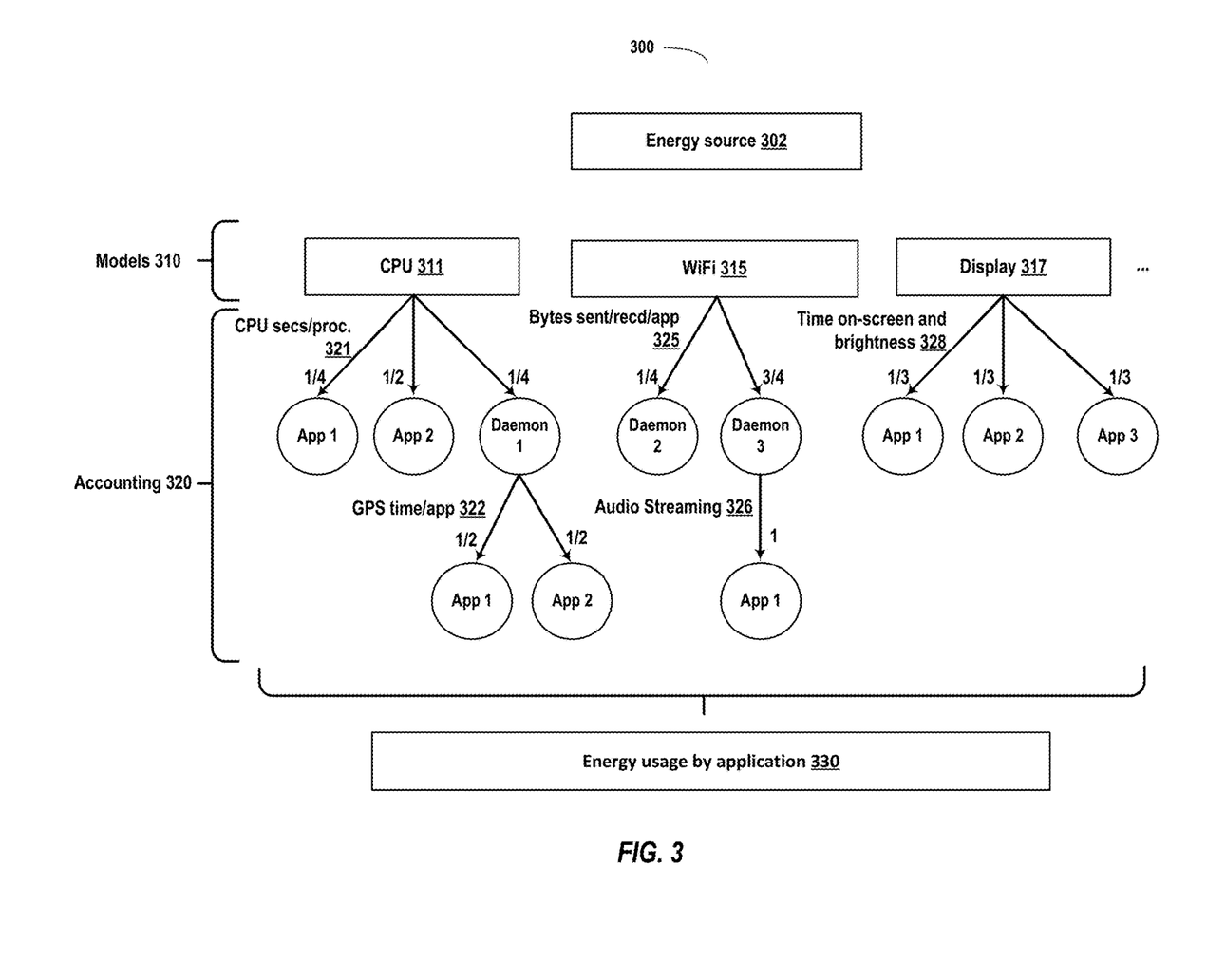
FIG. 3 illustrate an example of determining energy usage for one or more applications running on a client device, according to some embodiments.

FIG. 3 illustrate an example 300 of determining energy usage for one or more applications running on a client device 110, according to some embodiments.

A total amount of energy consumed from energy source 302 can be determined using energy measurement system 221. One or more models 310, such as CPU model 311, WiFi model 315, and display model 317, can be used to determine a portion of the total energy consumed by each of the subsystems. Models 310 correspond to exemplary models 242-247 described above with reference to FIG. 2. Here, CPU model 311, WiFi model 315, and display model 317 correspond to CPU subsystem 242, WiFi subsystem 243, and display subsystem 245, respectively.

Accounting 320 contains heuristics that can apportion energy usage by a subsystem to one or more applications and/or daemons, and determine the utility of energy consumed by an application and subsystem. Accounting 320 heuristics can form a part of models 310.

In the example of FIG. 3, CPU model 311 can call a function, framework, or API to determine a number of CPU seconds per process that makes up the energy consumed by CPU subsystem 212 during a predetermined window of time. Application 1 may have consumed ¼ of the energy consumed by the CPU subsystem 212 as modeled by CPU model 311; application 2 consumed ½ and daemon 1 consumed ¼ of the energy consumed by CPU subsystem 212 as modeled by CPU model 311. In an example wherein daemon 1 is a GPS daemon, it can further be determined that application 1 consumed ½ of the energy consumed by daemon 1 and application 2 consumed ½ of the energy consumed by GPS daemon 1. Thus, for CPU model 311, application 1 used ¼ of the energy consumed by CPU subsystem 212 plus the ½×¼ consumed by daemon 1 on behalf of application 1, for a total of ⅜ of the energy consumed by CPU subsystem 212. Similarly, application 2 consumed ½ of the energy consumed by CPU subsystem 212 plus the ½×¼ consumed by daemon 1 on behalf of application 2, for a total of ⅝ of the energy consumed by CPU subsystem 212, all as determined by CPU model 311.

WiFi model 315 can determine that daemon 2 used ¼ of the energy consumed by WiFi subsystem 213 and daemon 3 used ¾ of the energy consumed by WiFi subsystem 213. Energy usage can be apportioned by WiFi model 315 using bytes sent/received by WiFi subsystem 213. Daemon 2 may represent a subsystem that downloads updates to applications. Daemon 3 may represent an audio streaming daemon 326. In the example of FIG. 3, daemon 3 is doing work on behalf of application 1. Application 1 has used 1 (100%) of the energy attributable to daemon 3.

Display model 317 can apportion the energy used by display subsystem 215 to applications 1, 2, 3 which each used ⅓ of the energy attributable to the display subsystem 215 as determined by display model 317.

Energy usage by application can be collated 330, analyzed for utility, and stored for transmission to application information server 150. Energy usage daemon 231 can perform the functionality of energy usage by application 330. In an embodiment, energy usage information for a predetermined time period can be stored in a buffer and one or more time periods of energy usage information can be transmitted to application information server 150.

Figure 4:
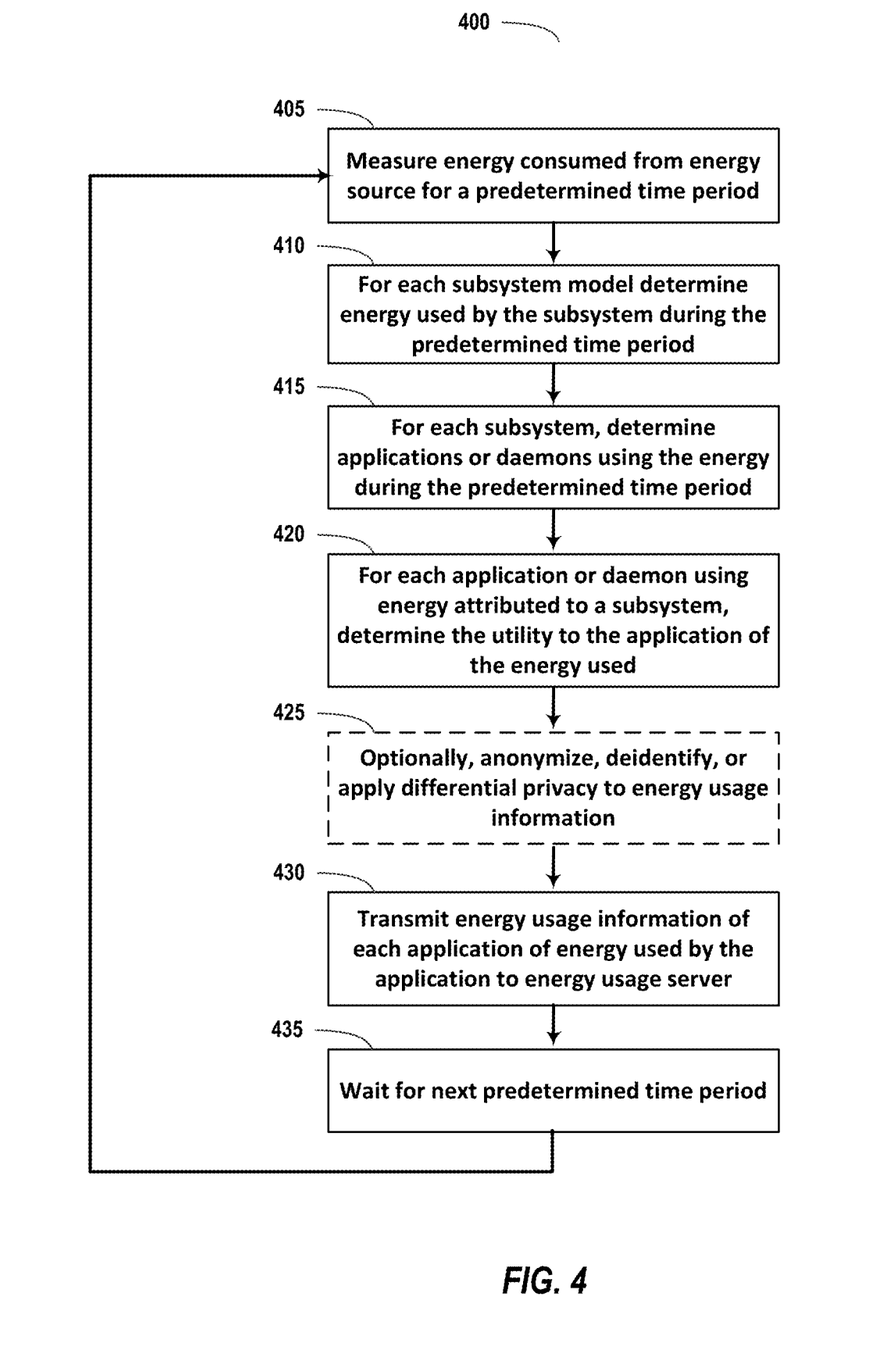
FIG. 4 illustrates a method of determining energy usage on a client device, per subsystem, and application, according to some embodiments.

FIG. 4 illustrates a method 400 of determining energy usage on a client device 110, per subsystem, and application, according to some embodiments.

In operation 405, energy consumed from energy source 211 can be measured by energy measurement module 221 for a predetermined period of time.

In operation 410, for each subsystem, e.g. CPU 212 through audio 217, models, e.g. CPU model 242 through Audio model 247, described above with reference to FIG. 2, can be used to determined energy consumed by each subsystem during the predetermined time period.

In operation 415, for each subsystem, models 310 and accounting heuristics 320 can be used to determined the energy consumed by the subsystem on behalf of one or more applications and/or daemons during the predetermined period of time. Models 310 as described in FIG. 3 include CPU 311, WiFi 315, and display 317. These models correspond to, and are the same models as, CPU model 242, WiFi model 243, and display mode 245 described with reference to FIG. 2.

In operation 420, for each application or daemon using energy attributed to a subsystem, models 310 and accounting heuristics 320 can be used to determine the utility to the user of the energy used by the application.

In operation 425, the energy usage information generated in operations 405 through 420 can optionally be anonymized, de-identified, or subject to client-side differential privacy before transmission to energy server 130 in operation 430.

In operation 430, the energy usage information for each application can be transmitted to energy usage server 130. In an embodiment, information identifying the client device type and/or operating system is also transmitted to the energy usage server 130. Additional application information can also be transmitted, such as a build date, version, title, or other identifying information of the identity and version of the application can be transmitted to the energy usage server 130 with the energy usage information for the application.

In operation 435, the energy usage information analysis method 400 can wait for the beginning of a next predetermined period of time before resuming the method 400 at operation 405.

Figure 5:
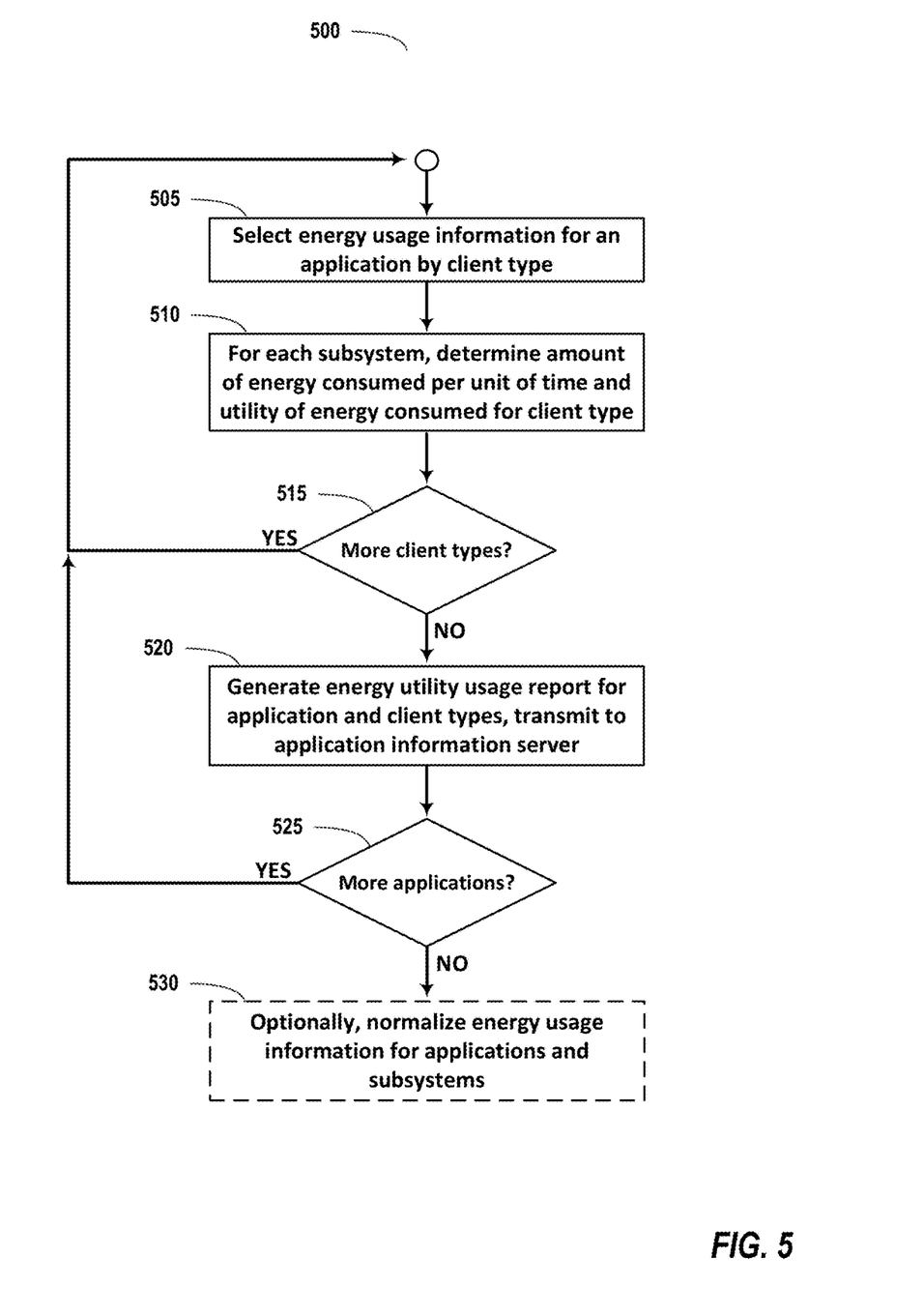
FIG. 5 illustrates a method of generating energy usage information for an application across a plurality of device types, according to some embodiments.

FIG. 5 illustrates a method 500 of generating energy usage information for an application across a plurality of device types, according to some embodiments.

In operation 505, energy usage server 130 can select energy usage information from a database of energy usage information received from a large plurality of clients, by client device type. In an embodiment, a client device type can be a particular manufacturer and model of device, e.g., Apple® iPhone 6S or Apple® iPad® Air, or other manufacturer of Smartphone, tablet, desktop, or other client computing device type.

In operation 510, for each subsystem of a client device type, energy usage server 130 can determine amount of energy consumed per unit of time, and the portion of the consumed energy that was determined to be of utility for the client device, for the client device type.

In operation 515, it can be determined whether there is energy information to process for more device types. If so, then method 500 continues at operation 505, otherwise method 500 continues at operation 520.

In operation 520, an energy utility usage report for the application for a plurality of client device types can be generated and transmitted to application information server 150.

In operation 525, it can be determined whether there are more applications of energy usage data for this client type to process. If so, the method 500 resumes at operation 505. Otherwise method 500 continues at operation 530.

In operation 530, energy usage information can optionally be normalized across subsystems and/or applications.

Figure 6:
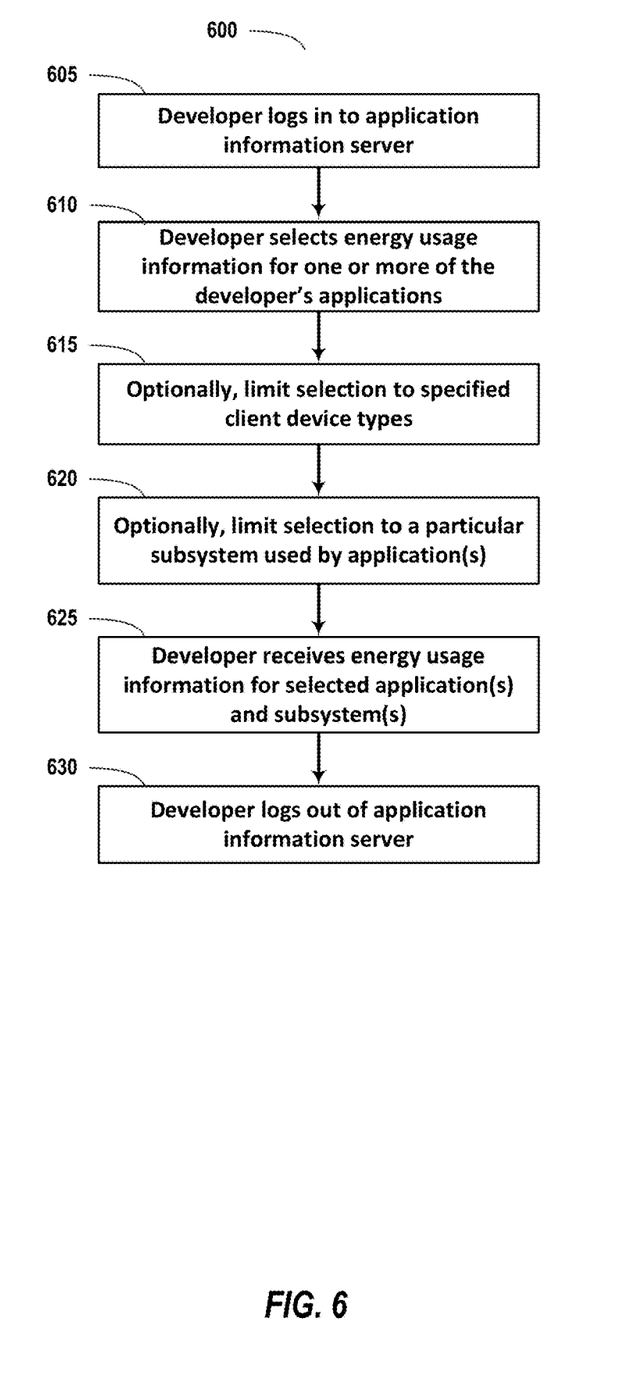
FIG. 6 illustrates a method of retrieving energy usage information from an application information server, according to some embodiments.

FIG. 6 illustrates a method 600 of retrieving energy usage information from an application information server 150, according to some embodiments. Energy usage information about an application can be retrieved by a developer 140 of the application from application information server 150. In an embodiment, a user who has purchased or otherwise legitimately obtained a copy of the application can retrieve energy usage information for the application from application server 150. In an embodiment, application information server 150 comprises a service such as Apple® iTunes® Store.

In operation 605, a developer 140 can log in to application information server 150. For example, developer 140 can log in to Apple® iTunes® Connect or other developer interface to access energy usage information for an application developed by developer 140.

In operation 610, developer 140 can select energy usage information for one or more of the developer's 140 applications for generating a report of energy usage. An exemplary energy usage report is described below with reference to FIG. 7.

In operation 615, developer 140 can optionally limit the energy usage information in the energy usage report to one or more specified device types.

In operation 620, developer 140 can optionally limit selection of energy usage information to one or more subsystems of the client device. As a practical example, a developer 140 may have received complaints from users of a certain client device type that battery usage is unusually short (i.e., energy usage is unusually high) for a particular application of the developer 140. Developer 140 may run very specific reports, limited to the client device type, and possibly subsystem, that is consuming an unusual amount of energy, in an attempt to isolate the problem.

In operation 625, developer 140 can receive energy usage information for the selected application(s), client device type(s), and subsystem(s) as may have been specified by the developer 140.

In operation 630, the developer may log out of the information server 150.

Figure 7:
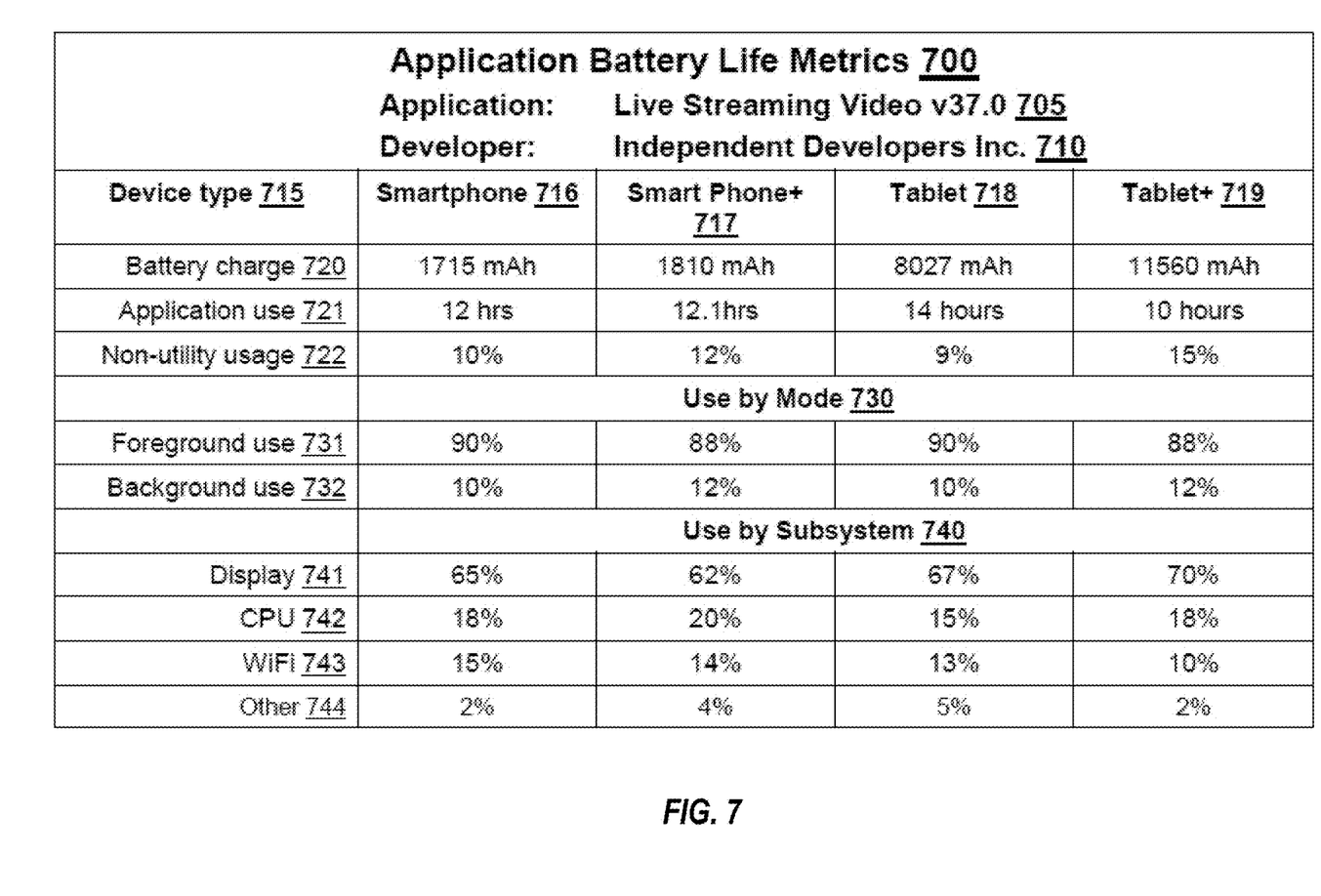
FIG. 7 illustrates exemplary energy usage metrics for an application and a plurality of client devices, according to some embodiments.

FIG. 7 illustrates exemplary energy usage metrics 700 for an application and a plurality of client devices, according to some embodiments. Energy usage metrics can be expressed as battery life metrics, however the metrics are useful even when the energy source 211 of the client device 110 is an AC/DC wall adapter. The energy metrics shown in FIG. 7 are exemplary and not limiting.

Application energy usage metrics 700 are shown for an example application, Live Streaming Video 705. An application title can include a version indicator, e.g. "v37.0" in the example title of FIG. 7. The developer 140 of the example application is Independent Developers Inc. 710. Independent developers Inc. 710 can access energy usage information from application information server 150 for applications that developed by Independent Developers Inc. 710.

Energy usage information can be presented for multiple client device types 715, such as Smartphone 716, Smartphone+ 717, Tablet 718, and Tablet+ 719. A Smartphone 717 can be, e.g., an Apple® iPhone® 6. A Smartphone+ 717 can be, e.g. an Apple® iPhone® 6 plus. A tablet 718 can be, e.g. an Apple® iPad®. A tablet+ 719 can be an Apple® iPad® Air. Each device type can indicate a battery charge capacity 720 such as 1715 mAh for the Smartphone 716. An average application use time per charge 721 can be given, such as 12 hours for the Live Streaming Video application 705 on the Smartphone 716. An indication of the amount of non-utility 722 energy consumed can also be indicated, such as 10% for Smartphone 716 for the application 705. In an embodiment, an amount of non-utility energy consumed can be presented for each subsystem 740.

In an embodiment, energy usage can be shown by use mode 730, such as 90% foreground mode 731 and 10% background mode 732 for Smartphone 716. In an embodiment, energy usage information can be presented by subsystem 740. Energy usage can be shown for energy used by the display subsystem 741, CPU subsystem 742, WiFi subsystem 743. In an embodiment, an energy usage by Other 744 can be shown. Other 744 may be used as an aggregate category for smaller, less consequential amounts of energy consumed.

In the example of FIG. 7, it can be seen that tablet+ 719 has a higher non-utility amount of 15% than other device types 715. Under the heading "use by subsystem" 740, it can be seen that display 741 and CPU 742 subsystems use more energy for the tablet+ 719 than the other device types 715, possibly indicating an energy-consuming defect in the application 705 for the tablet+ 719. A developer 710 may choose to run a detailed report of energy usage for the Live Streaming Video application 705, including non-utility "usage by mode" 730 and "use by subsystem" 740 to attempt to isolate the possible energy consuming defect in the application 705.

In an embodiment (not shown), energy usage information can be provided for multiple versions of an application 705 to shown trends in energy usage as the version of the application 705 changes.

Figure 8:
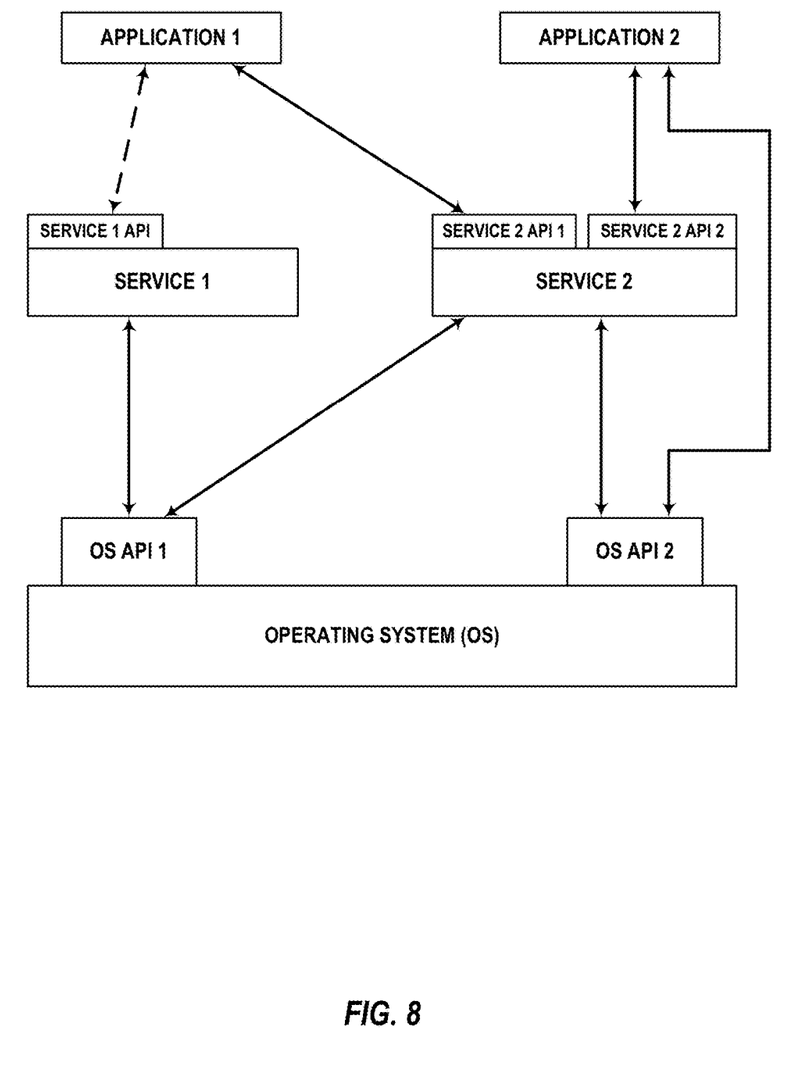
FIG. 8 illustrates an exemplary embodiment of a software stack usable in some embodiments of the invention.

In FIG. 8 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 9:
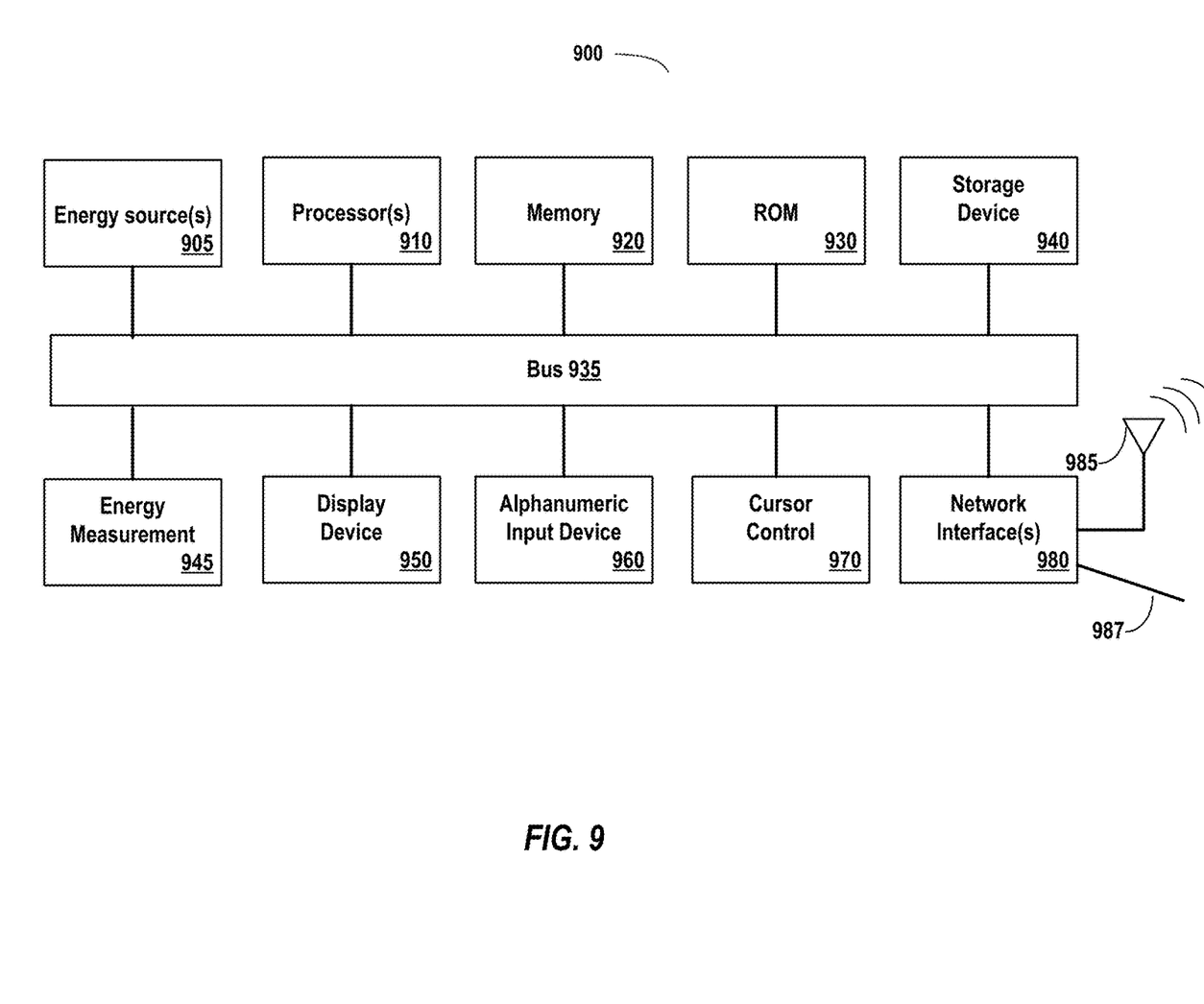
FIG. 9 is a block diagram of one embodiment of a computing system.

FIG. 9 is a block diagram of one embodiment of a computing system 900. The computing system illustrated in FIG. 9 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 9 may be used to provide the computing device and/or the server device.

Computing system 900 includes bus 935 or other communication device to communicate information, and processor 910 coupled to bus 935 that may process information.

While computing system 900 is illustrated with a single processor, computing system 900 may include multiple processors and/or co-processors 910. Computing system 900 further may include random access memory (RAM) or other dynamic storage device 920 (referred to as main memory), coupled to bus 935 and may store information and instructions that may be executed by processor(s) 910. Main memory 920 may also be used to store temporary variables or other intermediate information during execution of instructions by processor 910.

Computing system 900 may also include read only memory (ROM) and/or other static storage device 940 coupled to bus 935 that may store static information and instructions for processor(s) 910. Data storage device 940 may be coupled to bus 935 to store information and instructions. Data storage device 940 such as flash memory or a magnetic disk or optical disc and corresponding drive may be coupled to computing system 900.

Computing system 900 may also be coupled via bus 935 to display device 950, such as a cathode ray tube (CRT) or liquid crystal display (LCD), to display information to a user. Computing system 900 can also include an alphanumeric input device 960, including alphanumeric and other keys, which may be coupled to bus 935 to communicate information and command selections to processor(s) 910. Another type of user input device is cursor control 970, such as a touchpad, a mouse, a trackball, or cursor direction keys to communicate direction information and command selections to processor(s) 910 and to control cursor movement on display 950. Computing system 900 may also receive user input from a remote device that is communicatively coupled to computing system 900 via one or more network interfaces 980.

Computing system 900 further may include one or more network interface(s) 980 to provide access to a network, such as a local area network. Network interface(s) 980 may include, for example, a wireless network interface having antenna 985, which may represent one or more antenna(e). Computing system 900 can include multiple wireless network interfaces such as a combination of WiFi, Bluetooth® and cellular telephony interfaces. Network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, network interface(s) 980 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Computing system 900 can further include one or more energy sources 905 and an one or more energy measurement systems 945. Energy sources 905 can include an AC/DC adapter coupled to an external power source, one or more batteries, one or more charge storage devices, a USB charger, or other energy source. Energy measurement systems include at least one voltage or amperage measuring device that can measure energy consumed by the computing device 900 during a predetermined period of time. Additionally, one or more energy measurement systems can be included that measure, e.g., energy consumed by a display device, cooling subsystem, WiFi subsystem, or other frequently-used or high consumption subsystem.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, comprising:
   for each of a plurality of subsystems of a client device, using a subsystem model to determine a portion of total energy consumed during a time period that is attributable to the subsystem;
   for each of the plurality of subsystems, determining one or more sub-portions of the portion of total energy consumed by the subsystem during the time period that is attributable to each of one or more applications that have consumed energy attributable to the subsystem during the time period, and determining a utility of the each of the one or more sub-portions, wherein energy consumed has utility when:
   a. it is determined by the subsystem model, that a process of an application in the one or more applications performed one or more processing tasks by using the subsystem, on behalf of the application; and
   b. it is determined that the process consumed energy producing an output, on behalf of the application, that is directly perceivable by one or more senses of the user; and
   in response to determining the utility of the energy consumed, transmitting to an energy usage server, the total amount of energy consumed by an application of the one or more applications and the energy consumed by each subsystem on behalf of the application, wherein the server is configured to determine an energy usage trend of an application in the one or more applications over a plurality of application usage conditions.

2. The method of claim 1, wherein the subsystems include a CPU subsystem and a display subsystem, and the CPU subsystem model is different than the display subsystem model.

3. The method of claim 1, wherein an application of the one or more applications comprises a daemon.

4. The method of claim 3, wherein the daemon performs work on behalf of a first and a second application of the one or more applications, and wherein determining the portion of total energy consumed by the subsystem comprises determining a sub-portion of energy used by the daemon and determining further sub-portions of the energy consumed by the daemon that are attributable to each of the first and second applications.

5. The method of claim 1, wherein
   an application of the one or more applications is running in the foreground, displaying GPS location information, and a GPS location service is running in the background obtaining location information, and the energy consumed by both the application and the GPS location service has utility.

6. The method of claim 1 further comprising determining that the energy consumed by the process on behalf of the application does have not utility comprises, wherein the determining comprises:
   determining, by the subsystem module, that a process of an application in the one or more applications performed work on behalf of the application, and the performed work is intended to produce an output directly perceivable by the one or more senses of the user; and
   determining that the process performed the work intended to produce the output, and determining that the output was not directly perceivable by one or more senses of the user.

7. The method of claim 1, further comprising at least one of:
   de-identifying, anonymizing, encrypting, or applying differential privacy to the total energy consumed prior to transmitting the total energy consumed by the application.

8. The method of claim 1, wherein the transmitting further comprises information identifying at least one of the client device type or an operating system of the client device.

9. A non-transitory computer readable medium programmed with instructions that, when executed by a processing system, perform operations, comprising:
   for each of a plurality of subsystems of a client device, using a subsystem model to determine a portion of total energy consumed during a time period that is attributable to the subsystem;
   for each of the plurality of subsystems, determining one or more sub-portions of the portion of total energy consumed by the subsystem during the time period that is attributable to each of one or more applications that have consumed energy attributable to the subsystem during the time period, and determining a utility of the each of the one or more sub-portions, wherein energy consumed has utility when:
a. it is determined, by the subsystem model, that a process of an application in the one or more applications performed one or more processing tasks by using the subsystem on behalf of the application; and
b. it is determined that the process consumed energy producing an output, on behalf of the application, that is directly perceivable by one or more senses of the user; and
in response to determining the utility of the energy consumed, transmitting to an energy usage server, the total amount of energy consumed by an application of the one or more applications and the energy consumed by each subsystem on behalf of the application, wherein the server is configured to determine an energy usage trend of an application in the one or more applications over a plurality of application usage conditions.

10. The medium of claim 9, wherein the subsystems include a CPU subsystem and a display subsystem, and the CPU subsystem model is different than the display subsystem model.

11. The medium of claim 9, wherein an application of the one or more applications comprises a daemon.

12. The medium of claim 11, wherein the daemon performs work on behalf of a first and a second application of the one or more applications, and wherein determining the portion of total energy consumed by the subsystem comprises determining a sub-portion of energy used by the daemon and determining further sub-portions of the energy consumed by the daemon that are attributable to each of the first and second applications.

13. The medium of claim 9, wherein
an application of the one or more applications is running in the foreground, displaying GPS location information, and a GPS location service is running in the background obtaining location information, and the energy consumed by both the application and the GPS location service has utility.

14. The medium of claim 9, further comprising determining that the energy consumed by the application by the process on behalf of the application does not have utility, wherein the determining comprises:
determining, by the subsystem module, that a process of an application in the one or more applications performed work on behalf of the application, and the performed work is intended to produce an output directly perceivable by the one or more senses of the user; and
determining that the process performed the work intended to produce the output, and determining that the output was not directly perceivable by one or more senses of the user.

15. The medium of claim 9, further comprising at least one of:
de-identifying, anonymizing, encrypting, or applying differential privacy to the total energy consumed prior to transmitting the total energy consumed by the application.

16. The medium of claim 9, wherein the transmitting further comprises information identifying at least one of the client device type or an operating system of the client device.

17. A system comprising:
a processing system coupled to a memory programmed with executable instructions that, when executed by the processing system perform operations, comprising:
for each of a plurality of subsystems of a client device, using a subsystem model to determine a portion of total energy consumed during a first time period that is attributable to the subsystem;
for each of the plurality of subsystems, determining one or more sub-portions of the portion of total energy consumed by the subsystem during the time period that is attributable to each of one or more applications that have consumed energy attributable to the subsystem during the time period, and determining a utility of the each of the one or more sub-portions, wherein energy consumed has utility when:
a. it is determined, by the subsystem model, that a process of an application in the one or more applications performed one or more processing tasks by using the subsystem, on behalf of the application; and
b. it is determined that the process consumed energy producing an output, on behalf of the application, that is directly perceivable by one or more senses of the user; and
in response to determining the utility of the energy consumed, transmitting to an energy usage server, the total amount of energy consumed by an application of the one or more applications and the energy consumed by each subsystem on behalf of the application, wherein the server is configured to determine an energy usage trend of an application in the one or more applications over a plurality of application usage conditions.

18. The system of claim 17, wherein the subsystems include a CPU subsystem and a display subsystem, and the CPU subsystem model is different than the display subsystem model.

19. The system of claim 17, wherein an application of the one or more applications comprises a daemon.

20. The system of claim 19, wherein the daemon performs work on behalf of a first and a second application of the one or more applications, and wherein determining the portion of total energy consumed by the subsystem comprises determining a sub-portion of energy used by the daemon and determining further sub-portion of the energy consumed by the daemon that are attributable to each of the first and second applications.

21. The system of claim 17, wherein
an application of the one or more applications is running in the foreground, displaying GPS location information, and a GPS location service is running in the background obtaining location information, and the energy consumed by both the application and the GPS location service has utility.

22. The system of claim 17, further comprising determining that the energy consumed by the process on behalf of the application does not have utility, wherein the determining comprises:
determining, by the subsystem module, that a process of an application in the one or more applications performed work on behalf of the application, and the performed work is intended to produce an output directly perceivable by the one or more senses of the user; and determining that the process performed the work intended to produce the output, and determining that the output was not directly perceivable by one or more senses of the user.

23. The system of claim 17, further comprising at least one of:
de-identifying, anonymizing, encrypting, or applying differential privacy to the total energy consumed prior to transmitting the total energy consumed by the application.

24. The system of claim 17, wherein the transmitting further comprises information identifying at least one of the client device type or an operating system of the client device.

* * * * *